(No Model.)  5 Sheets—Sheet 1.

M. A. HOLTON.
LEATHER SKIVING MACHINE.

No. 250,734.  Patented Dec. 13, 1881.

Witnesses;
Walter Fowler
R. K. Evans

Inventor;
Merritt A. Holton
by A. H. Evans & Co.
his attys (No Model.) 5 Sheets—Sheet 2.
M. A. HOLTON.
LEATHER SKIVING MACHINE.
No. 250,734. Patented Dec. 13, 1881.
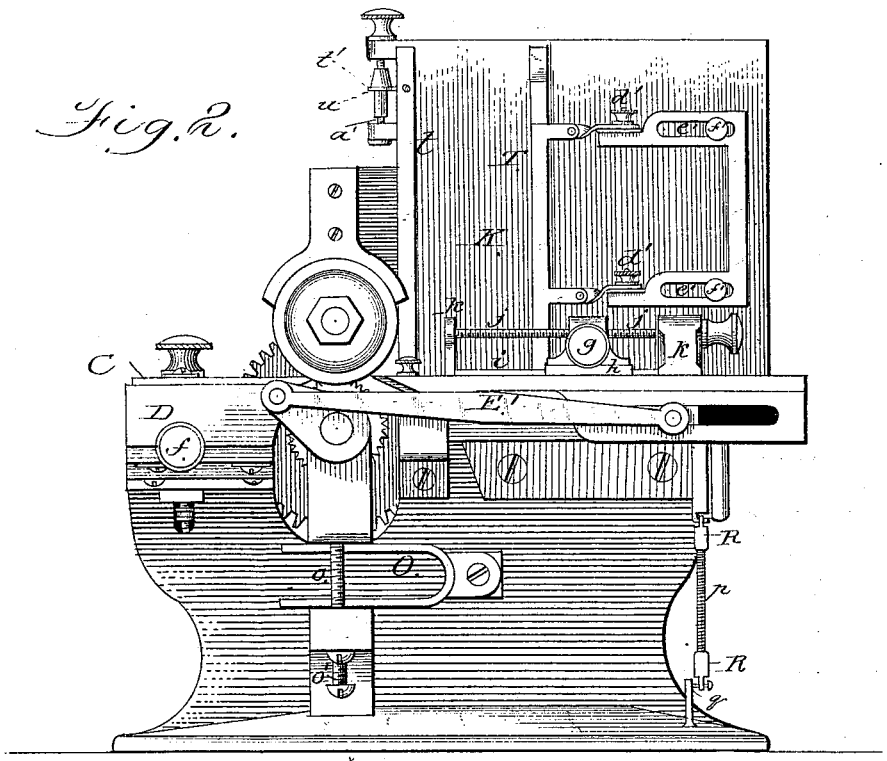
Fig. 2.
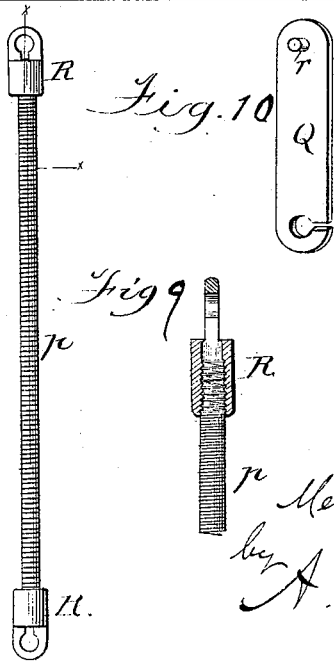
Fig. 8. Fig. 10.
Fig. 9.
Witnesses
T. Walter Fowler
R. K. Evans
Inventor;
Merritt A. Holton
by A. H. Evans & Co
his attys (No Model.) 5 Sheets—Sheet 3.

M. A. HOLTON.
LEATHER SKIVING MACHINE.

No. 250,734. Patented Dec. 13, 1881.

Witnesses:
Walter Fowler,
R. K. Evans

Inventor;
Merritt A. Holton
by A. H. Evans & Co
his attys (No Model.)  5 Sheets—Sheet 4.

M. A. HOLTON.
LEATHER SKIVING MACHINE.

No. 250,734.  Patented Dec. 13, 1881.

Witnesses:  Inventor;

(No Model.)  5 Sheets—Sheet 5.

M. A. HOLTON.
LEATHER SKIVING MACHINE.

No. 250,734.  Patented Dec. 13, 1881.

Witnesses:
Walter Fowler,
R. K. Evans

Inventor:
Merritt A. Holton
by A. H. Evans & Co
his attys

UNITED STATES PATENT OFFICE.

MERRITT A. HOLTON, OF FITCHBURG, MASSACHUSETTS.

LEATHER-SKIVING MACHINE.

SPECIFICATION forming part of Letters Patent No. 250,734, dated December 13, 1881.

Application filed September 15, 1881. (No model.)

*To all whom it may concern:*

Figure 1:
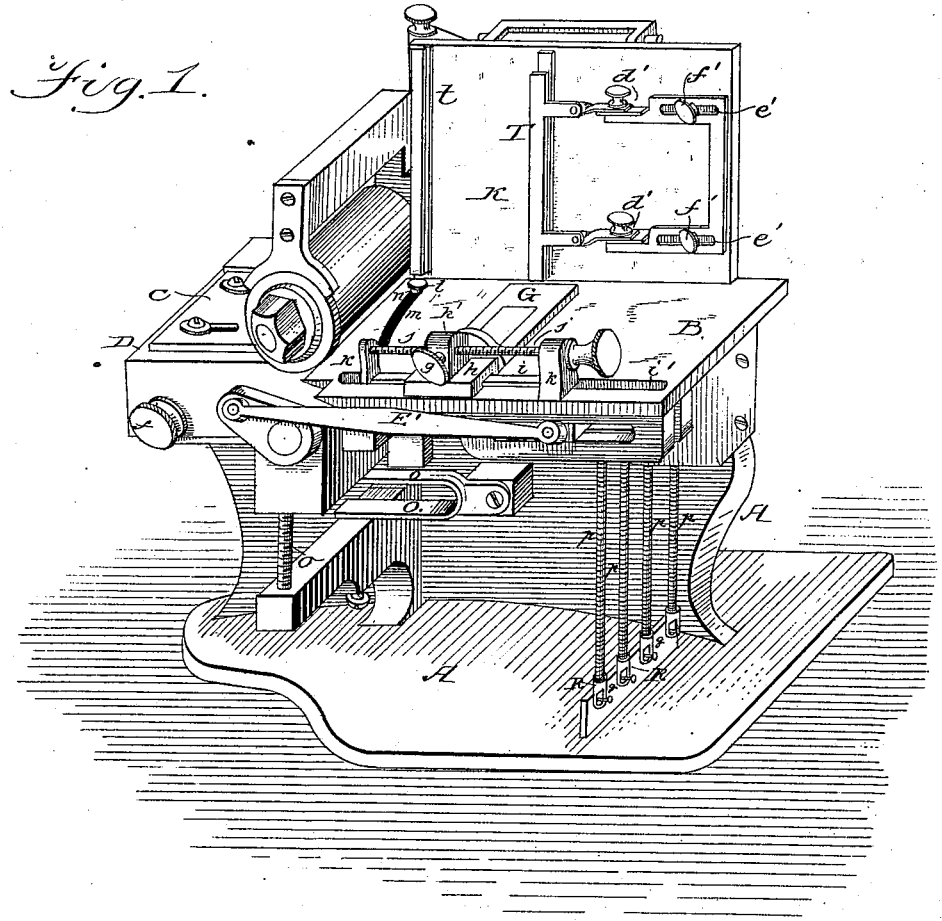
Figure 3:
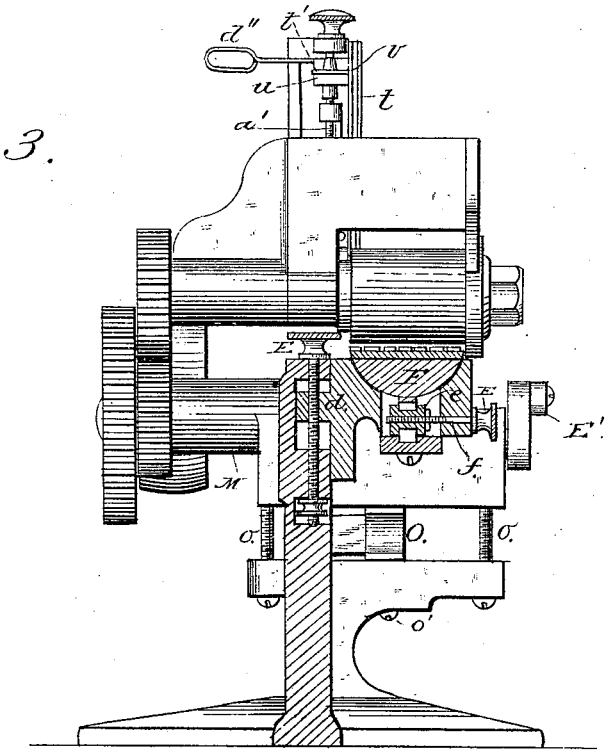
Figure 12:
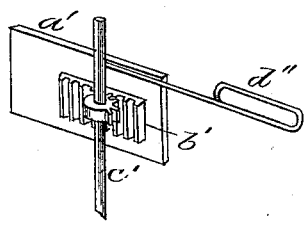
Figure 4:
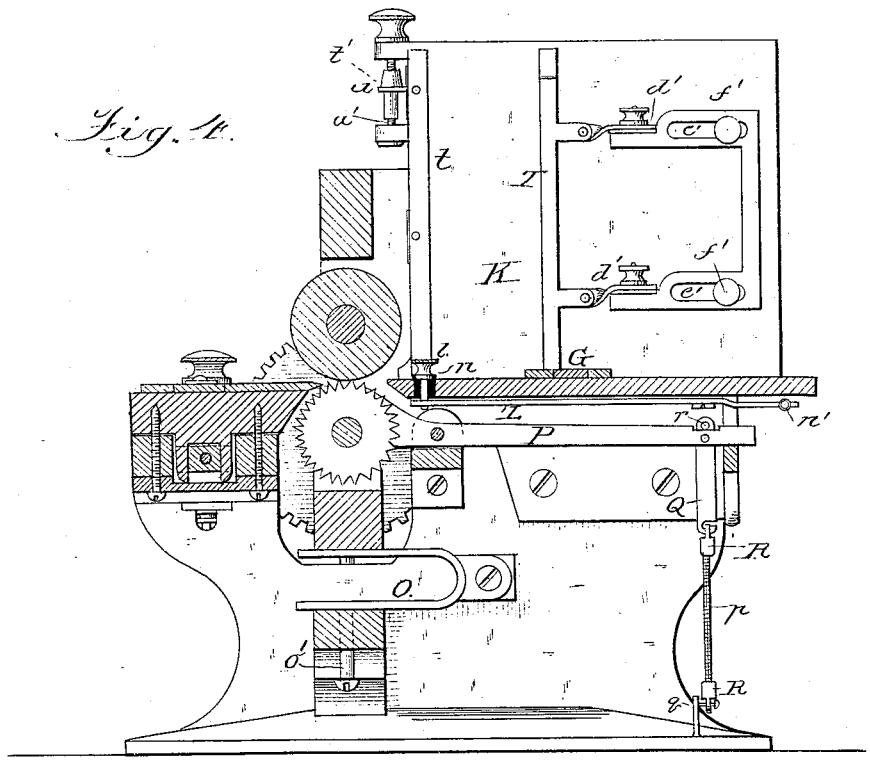
Figure 6:
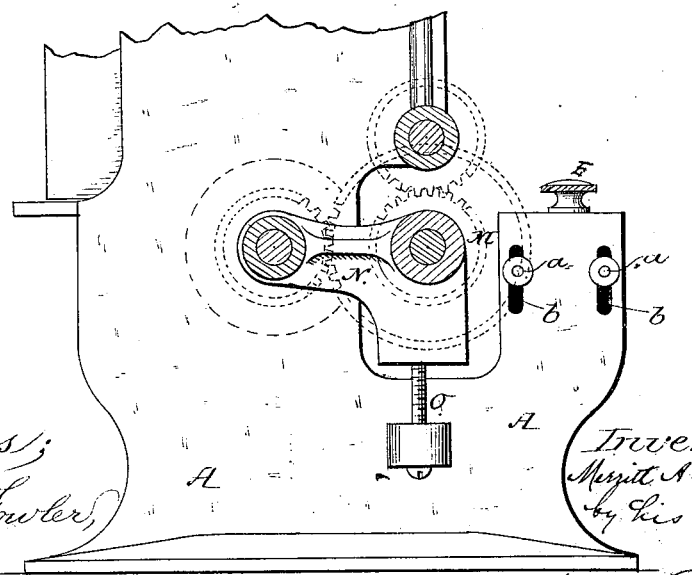
Figure 7:
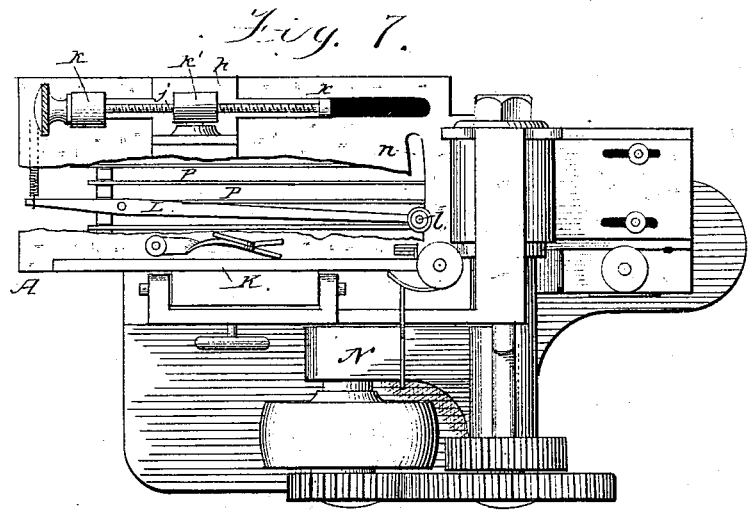
Figure 5:
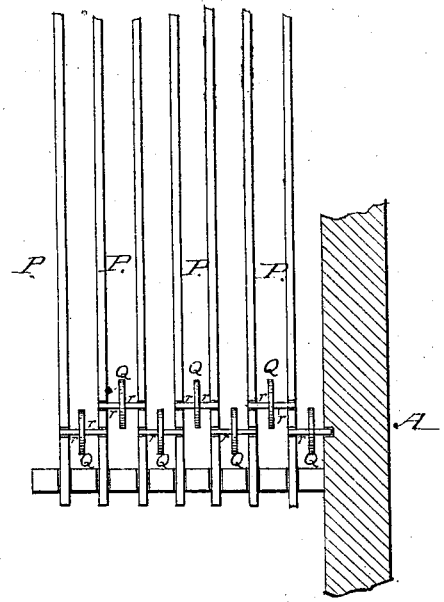

Be it known that I, MERRITT A. HOLTON, of Fitchburg, in the county of Worcester and State of Massachusetts, have invented certain Improvements in Leather-Skiving Machines; and I hereby declare the following to be a full, clear, and exact description thereof, reference being had to the accompanying drawings, making part of this specification, in which—
Figure 1 is a perspective view of the machine. Fig. 2 is a side elevation. Fig. 3 is a vertical sectional view through the knife-rest. Fig. 4 is a horizontal section through the knife-rest. Fig. 5 is a vertical cross-section, showing the manner of attaching the springs to the levers. Fig. 6 is an elevation showing the gearing and the method of adjusting the double ribs. Fig. 7 is a plan view with a portion of the table cut away to illustrate the spring-lever. Figs. 8, 9, and 10 are details to be referred to.

My invention appertains to machines for skiving leather, particularly that class of machines used for skiving shoe-tips; and my invention consists in sundry improvements on the machines patented by me October 7, 1879, and July 20, 1880, as will hereinafter be fully described and specifically claimed.

In order that those skilled in the art may make and use my invention, I will proceed to describe the manner in which I have carried it out.

In the said drawings, A is the frame or support of the machine, and B the table. The knife C is secured to a knife-rest, D, which, by means of screws $a\ a$ and slots $b\ b$, is capable of a vertical adjustment, which is accomplished by an endless screw, E, which has bearings in the frame A and passes through a nut or projection, $d$, on the rest.

In order to adjust the knife in and out of the plane of the rolls, the knife-rest is made with a semi-cylindrical depression in it, into which fits a semi-cylindrical knife-carrying block, F, provided with a tongue or projection, $e$, passing through the rest D and rocked back and forth by means of endless screw $f$, as seen in Fig. 3.

The feed-plate G is secured by means of an adjusting-screw, $g$, which adjusts it transversely to a reciprocating head, $h$, which is secured to and moves with the reciprocating bar $i$, which moves in groove $i'$, and is actuated by the pitman E'. An endless screw, $j$, sustained in standards $k\ k$ on bar $i$, passes through the stud $k'$ on the head $h$ and serves to adjust it longitudinally.

In order to keep the work crowded or close against the gage-board K, I provide a pivoted lever, L, having its pivot beneath the table. At the end of said lever, adjacent to the rolls, is a stud, $l$, which passes up through a curved slot, $m$, in the table, and is provided with an anti-friction roller, $n$, against which the edge of the work bears. The rear end of the lever is held by a coiled spring, $n'$, so as to keep a constant tension on the work. By this device I avoid the curved spring shown in my patent of July 20, 1880, and remove it as an obstruction to the table, also avoiding breakage of it from crystallization, and the fragments getting into the working parts of the machine. In this machine I apply the power to the feed-roll shaft, and then transmit it to the upper-roll shaft. This I accomplish by sustaining the feed-roll shaft by adjusting-screws $o\ o$ on each side of the frame bearing against a swinging journal-box, M, provided with an arm, N, swiveled to the shaft of the driving-pulley, whereby a proper relation is always maintained between the cog on the feed-roller shaft and the cog on the driving-pulley shaft. The spring O under the frame which carries the feed-roll holds the roll against the stock as it passes over it, causing the corrugations to take hold of the leather and feed it against the knife. The tension of this spring is regulated by a set-screw, O'.

The presser-arms P are of the character shown and described in my Patent No. 220,286, and are held down by spiral springs $p\ p$, having their lower ends secured to the base of the frame at $q$, and their upper ends provided with hook-plates Q, having short cross-bars or trunnions $r$ near one end. The way I apply the springs to the arms is to suspend between every two arms one of the hook-plates Q, so that the cross-bars $r$ will rest on the two presser-arms. Thus each arm will have one-half of two springs bearing on it, or the equivalent of one spring;
but no arm can be raised without distending two springs, so that any high or hard place in the stock which is being worked, which will tend to raise the end of the arm over which it passes higher than those on each side, will be subjected to double pressure or less, according to the height to which it is raised. Thus extra pressure is applied to any part of the material that may need it to require it to conform to the configuration of the upper roll.

I have found that bending the wire into loops at the ends of the coiled springs affords a very insecure fastening. I provide a secure fastening in the threaded head R, provided with an eye or loop. The interior of the head is threaded of a dimension corresponding to the size of the wire and of a pitch equal to that of the coil. The head R is screwed onto the end of the coil and holds it securely.

The edge of the swinging guide-plate carries an adjustable double rib, $t$, to prevent more than one thickness of stock being presented to the rollers at one time.

The vertical adjustment is accomplished by means of a set-screw traveling through a hub, $u$, to which is attached a gib, $v$, which sets into a groove, $t'$, in a plate, $a'$, formed integral with double rib $t$. The back of plate $a'$ is provided with a rack-bar, $b'$, into which meshes a pinion on rod $c'$, operated by lever $d''$, whereby the distance between the swinging plate and the double rib $t$ is increased or diminished at will. I also provide the guide-plate with another double-rib attachment, T, which is adjustable to and from the plate by means of the screw-hinges $d'\ d'$, and adjustable longitudinally by means of slots $e'\ e'$ and set-screws $f'\ f'$. These adjustable double ribs enable me to handle on this machine pieces of leather which may have very irregular edges, so much so that they perhaps might touch the guide-plate only at one point. To adjust the ribs to hold this style of work, they are set far enough from the guide-plate to hold the points of the tips while the center touches the guide-plate and the pile of tips lie on the table perpendicular to the rolls. Now, the feed-plate is adjusted by means of the screw $g$, so that one of the notches in its front edge comes directly under the ribs T. As the plate travels forward and back on the table, in its forward movement it takes the point of the bottom tip into the notch, and as it cannot slip out or slew around it is carried straight forward between the rolls.

I find it highly economical in these machines to make the impression or upper roll of type-metal. I also place on the surface of the impression-roll the imprint desired to be stamped on the tip or work, so that the skiving and stamping of the shoe-tip are both done at one operation.

Having thus described my invention, what I claim as new, and desire to secure by Letters Patent, is—

1. In a leather-skiving machine, the vertically-adjustable knife-rest, in combination with the slotted frame and endless screw, substantially as and for the purpose set forth.

2. The knife-rest of a skiving-machine, in combination with the semi-cylindrical inserted block, adjustable in the arc of a circle, for the purpose described.

3. In a leather-skiving machine, the presser-arms, in combination with the coiled springs and connecting-plates, provided with cross-bars or trunnions at their ends, substantially as set forth.

4. An elastic holding device for the presser-arms of a leather-skiving machine, consisting of a spiral spring, in combination with a head, R, having an interior thread of a dimension and pitch corresponding to the dimension and pitch of the wire coil, as specified.

5. The feed-plate, in combination with a reciprocating head provided with adjusting-screws at right angles to each other, substantially as and for the purpose specified.

6. The adjustable double rib $t$, in combination with gib $v$, grooved plate $a'$, and adjusting devices, substantially as described.

7. The swinging gage-plate, in combination with the double-rib attachment T, screw-hinges $d'\ d'$, and supporting-frame provided with slots $e'\ e'$, all constructed, arranged, and operated as set forth.

8. In a leather-skiving machine, the irregular-surfaced impression-roll provided with a die or imprint for stamping the work at the same operation with the skiving, as described.

MERRITT A. HOLTON.

Witnesses:
EDWARD P. LORING,
GEO. RAYMOND.